(12) United States Patent
Kong et al.

(10) Patent No.: US 12,401,083 B2
(45) Date of Patent: Aug. 26, 2025

(54) BATTERY MODULE COVER MEMBER HAVING PATTERN OF PROTRUSIONS PROTRUDING IN DIFFERENT DIRECTIONS FORMED THEREON, MANUFACTURING METHOD THEREFOR, AND BATTERY MODULE INCLUDING SAME

(71) Applicant: LG Energy Solution, Ltd., Seoul (KR)

(72) Inventors: Jeong Pyo Kong, Daejeon (KR); Bo Seon Kim, Daejeon (KR); Seung Hyun Yun, Daejeon (KR); Byung Ryong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 638 days.

(21) Appl. No.: 17/637,625

(22) PCT Filed: Feb. 25, 2021

(86) PCT No.: PCT/KR2021/002390
§ 371 (c)(1),
(2) Date: Feb. 23, 2022

(87) PCT Pub. No.: WO2021/194107
PCT Pub. Date: Sep. 30, 2021

(65) Prior Publication Data
US 2022/0278413 A1    Sep. 1, 2022

(30) Foreign Application Priority Data

Mar. 23, 2020 (KR) ........................ 10-2020-0034864

(51) Int. Cl.
*H01M 50/271* (2021.01)
*H01M 50/20* (2021.01)
(Continued)

(52) U.S. Cl.
CPC ......... *H01M 50/271* (2021.01); *H01M 50/20* (2021.01); *H01M 50/233* (2021.01);
(Continued)

(58) Field of Classification Search
None
See application file for complete search history.

(56) References Cited

U.S. PATENT DOCUMENTS

| 6,555,264 | B1 | 4/2003 | Hamada et al. |
| 2011/0171512 | A1 | 7/2011 | Im et al. |

(Continued)

FOREIGN PATENT DOCUMENTS

| CN | 101682003 A | 3/2010 |
| CN | 108370075 A | 8/2018 |

(Continued)

OTHER PUBLICATIONS

International Search Report for Application No. PCT/KR2021/002390 mailed Jun. 7, 2021, 2 pages.
(Continued)

*Primary Examiner* — Jonathan Crepeau
(74) *Attorney, Agent, or Firm* — Lerner David LLP

(57) ABSTRACT

The present invention relates to: a battery module cover member that has a pattern of protrusions protruding in different directions formed thereon, and thus has improved flatness; a battery module case including the cover member; and a battery module including the same. Although manufactured as a thin film, the battery module cover member has excellent mechanical strength and flatness due to the formation of a pattern of protrusions protruding in opposite directions.

14 Claims, 6 Drawing Sheets

(51) Int. Cl.
  *H01M 50/209* (2021.01)
  *H01M 50/224* (2021.01)
  *H01M 50/233* (2021.01)
  *H01M 50/238* (2021.01)
  *H01M 50/276* (2021.01)

(52) U.S. Cl.
  CPC ........ *H01M 50/238* (2021.01); *H01M 50/209* (2021.01); *H01M 50/224* (2021.01); *H01M 50/276* (2021.01)

(56) References Cited

U.S. PATENT DOCUMENTS

| | | |
|---|---|---|
| 2012/0312614 A1 | 12/2012 | Fujiwara et al. |
| 2013/0252059 A1 | 9/2013 | Choi et al. |
| 2015/0024253 A1 | 1/2015 | Noh |
| 2016/0133890 A1 | 5/2016 | Lee et al. |
| 2016/0156004 A1 | 6/2016 | Kim et al. |
| 2018/0175343 A1 | 6/2018 | Choi et al. |
| 2018/0331336 A1 | 11/2018 | Choi et al. |
| 2019/0229313 A1 | 7/2019 | Lee et al. |

FOREIGN PATENT DOCUMENTS

| | | |
|---|---|---|
| CN | 109863619 A | 6/2019 |
| CN | 209071434 U | 7/2019 |
| CN | 209298215 U | 8/2019 |
| CN | 209312833 U | 8/2019 |
| EP | 2615664 A1 | 7/2013 |
| EP | 2999024 A1 | 3/2016 |
| JP | 2000149900 A | 5/2000 |
| JP | 2001176487 A | 6/2001 |
| JP | 2012256468 A | 12/2012 |
| JP | 2013201112 A | 10/2013 |
| JP | 2016514344 A | 5/2016 |
| JP | 2016523431 A | 8/2016 |
| JP | 2017084467 A | 5/2017 |
| JP | 2018073545 A | 5/2018 |
| KR | 20090000307 A | 1/2009 |
| KR | 20130098748 A | 9/2013 |
| KR | 20130110246 A | 10/2013 |
| KR | 101390872 B1 | 5/2014 |
| KR | 20140084564 A | 7/2014 |
| KR | 20150010226 A | 1/2015 |
| KR | 20160071900 A | 6/2016 |
| KR | 20160079515 A | 7/2016 |
| KR | 20160107583 A | 9/2016 |
| KR | 20170095021 A | 8/2017 |
| KR | 20170135597 A | 12/2017 |
| KR | 20180059146 A | 6/2018 |
| KR | 20190012979 A | 2/2019 |
| WO | 2009002096 A1 | 12/2008 |
| WO | 2011030194 A1 | 3/2011 |

OTHER PUBLICATIONS

Extended European Search Report for Application No. 21774457.2 dated Oct. 12, 2022. 8 pgs.

Search Report dated Oct. 10, 2024 from the Office Action for Chinese Application No. 202180005022.5 issued Nov. 9, 2024, 2 pages.

[FIG. 1]
-- Prior Art --
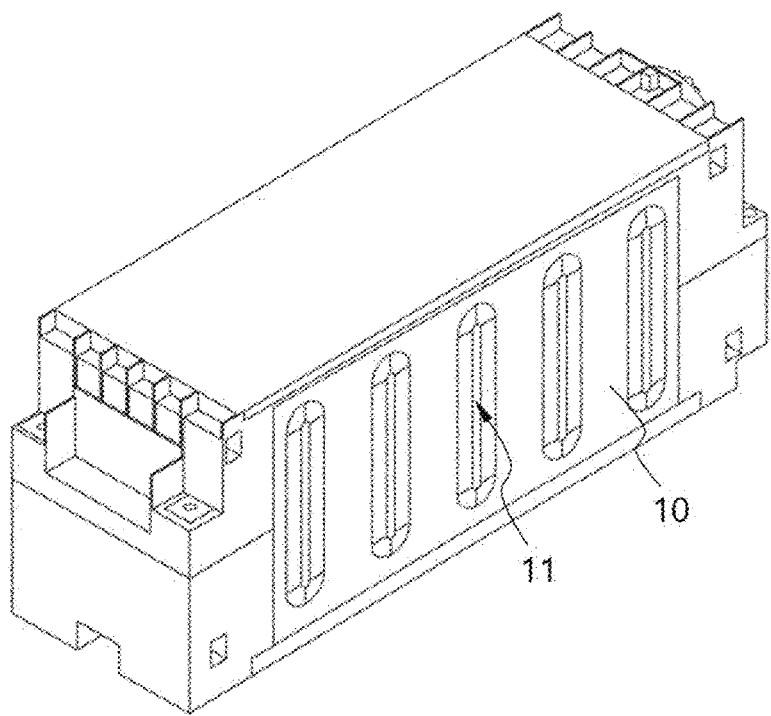

[FIG. 2]
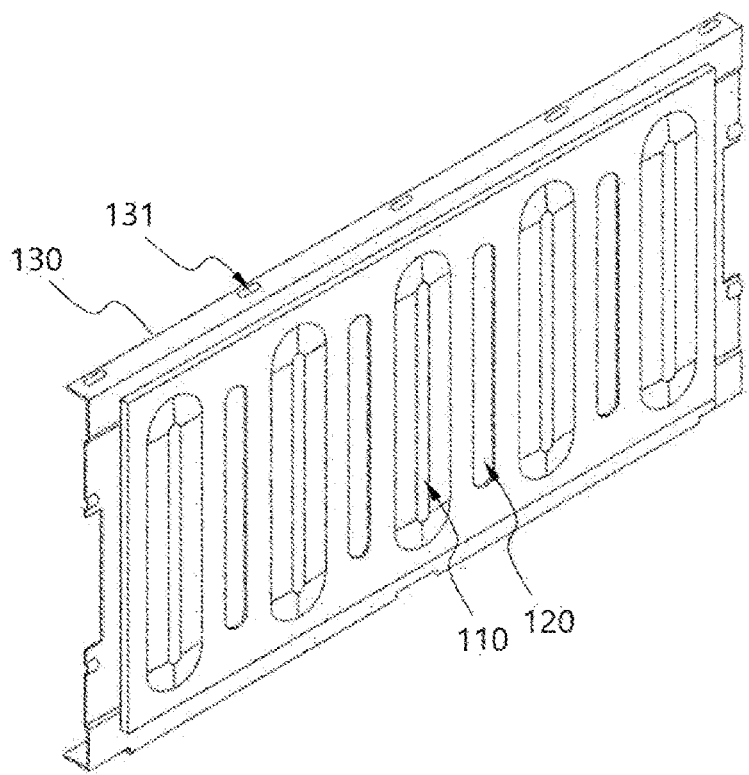

[FIG. 3]
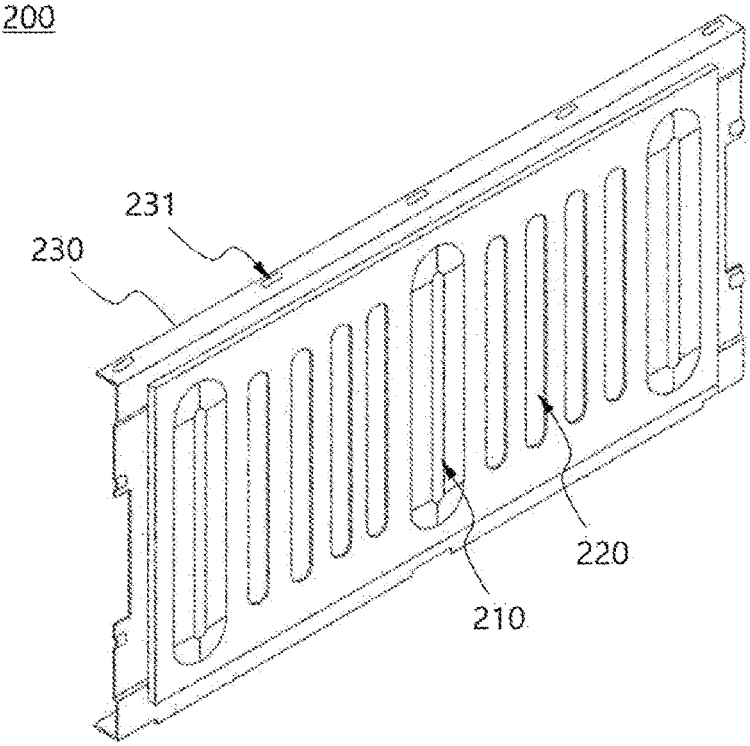

[FIG. 4]
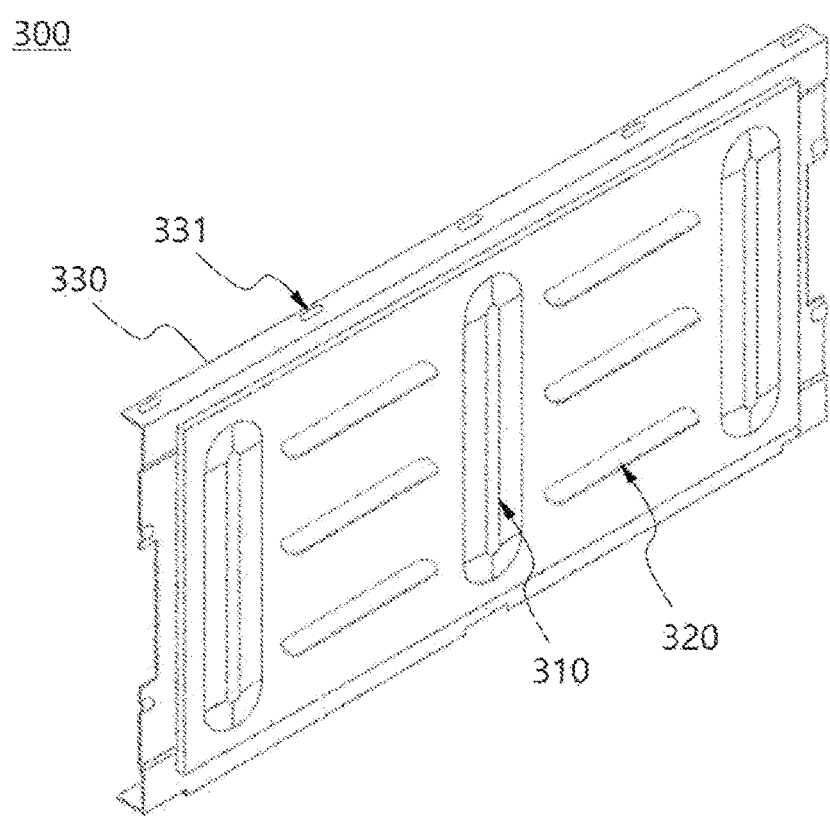

[FIG. 5]
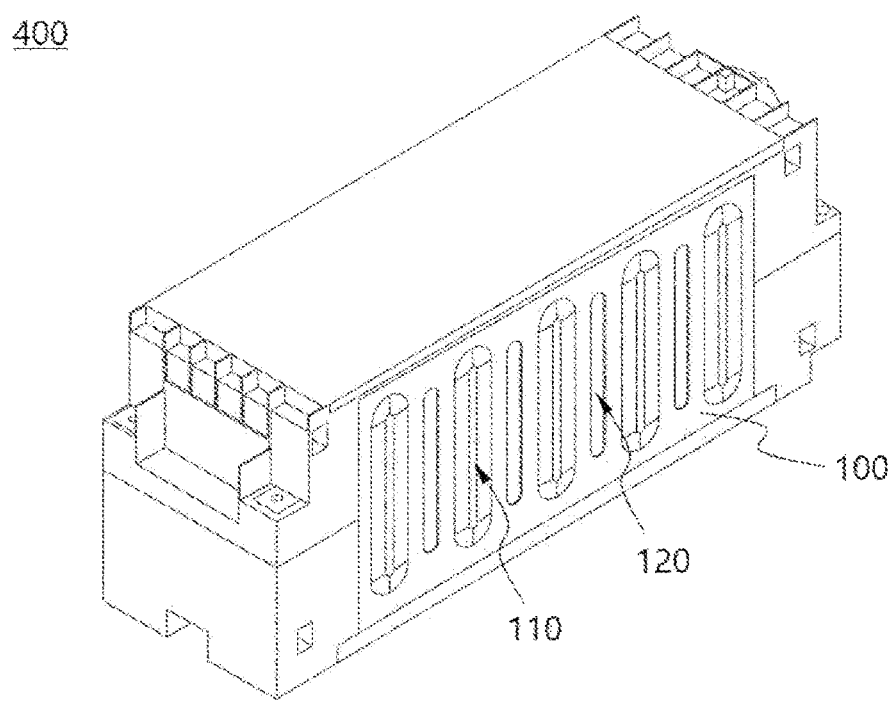

[FIG. 6]
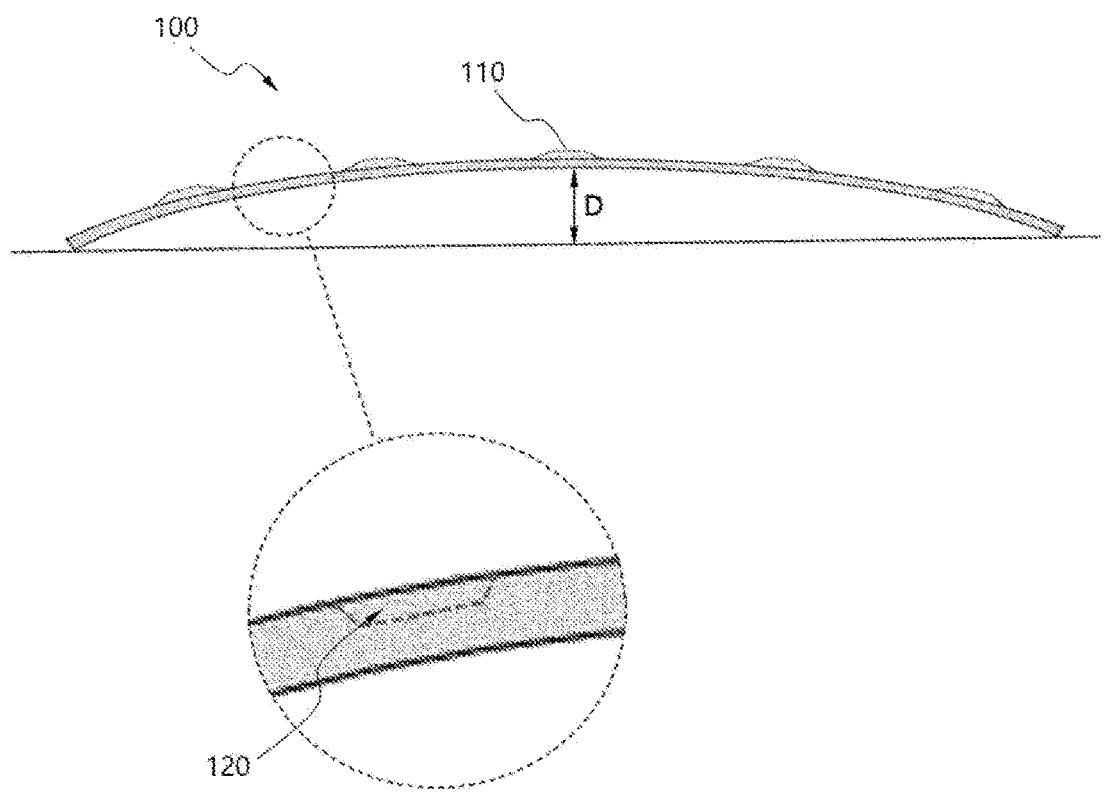

BATTERY MODULE COVER MEMBER HAVING PATTERN OF PROTRUSIONS PROTRUDING IN DIFFERENT DIRECTIONS FORMED THEREON, MANUFACTURING METHOD THEREFOR, AND BATTERY MODULE INCLUDING SAME

CROSS-REFERENCE TO RELATED APPLICATIONS

This application is a national phase entry under 35 U.S.C. § 371 of International Application No. PCT/KR2021/002390, filed on Feb. 25, 2021, published in Korean, which claims priority to Korean Patent Application No. 10-2020-0034864, filed on Mar. 23, 2020, the entire contents of which are hereby incorporated herein by reference.

TECHNICAL FIELD

The present invention relates to a battery module cover material having uneven patterns protruding in different directions, a method of manufacturing the same, and a battery module including the same.

BACKGROUND ART

In general, a secondary battery is a battery which can be repeatedly used by allowing charging and discharging. The secondary battery consists of one battery module and is used for portable compact electronic devices such as mobile phones, laptops, computers, cameras, camcorders, etc. or consists of a battery pack containing a plurality of cell modules and is used as a power source for driving a motor of a high power hybrid electric vehicle (HEV), electric vehicle (EV), etc.

In order to apply a secondary battery as a power source for an electric vehicle, etc. a high output is required. To this end, a battery module generated by modularizing a plurality of battery cells, or a battery pack generated by combining a plurality of battery modules is manufactured, which is then applied to an electric vehicle, etc.

FIG. 1 is a perspective view of a conventional battery module. Referring to FIG. 1, an existing battery module 20 has a structure in which a plurality of battery cells are accommodated in a battery module case. Further, in order to minimize the volume and weight of the battery module, a battery module cover material 10 applied to a side surface is allowed to be formed as an aluminum thin film of a 0.4 T level, and in order to bear the load, an uneven pattern 11 is formed in a vertical direction. However, in the battery module cover material 10 which is formed in a metal thin film, twisting or bending occurs during the molding process, and particularly, the flatness of the cover material significantly decreases in the process of forming a pattern.

Therefore, there is a need for a technology for increasing flatness while maintaining the mechanical strength of the battery module cover material.

DISCLOSURE

Technical Problem

The present invention has been created to solve the above problems, and an object of the present invention is to provide a battery module cover material having an improved flatness by forming uneven patterns protruding in different directions, a battery module case including the cover material, and a battery module including the same.

Technical Solution

The present invention provides a battery module cover material. In one example, a battery module cover material according to the present invention is a plate-shaped cover material covering one surface of a battery module, including:
first uneven patterns having a shape protruding in a thickness direction; and
second uneven patterns having a shape recessed in a thickness direction.

Herein, the second uneven patterns are arranged between the first uneven patterns, and
the average recess depth of the second uneven pattern is in a range of 10 to 80% of the thickness of the plate-shaped cover material.

In one example, the average thickness of the plate-shaped cover material is in the range of 0.1 to 0.6 mm.

In another example, in the battery module cover material, the ratio (D1:D2) of the average protrusion height (D1) of the first uneven patterns to the average recess depth (D2) of the second uneven patterns is in the range of 3:1 to 50:1.

In one example, the first uneven patterns have a closed figure shape which is long in the first direction, and the ratio (L1:L2) of the width (L1) in the first direction to the width (L2) in the second direction perpendicular to the first direction on the same plane is in the range of 3:1 to 10:1.

In another example, the second uneven patterns have a closed figure shape which is long in the first direction, and the ratio (L1':L2') of the width (L1') in the first direction to the width (L2') in the second direction perpendicular to the first direction on the same plane is in the range of 5:1 to 20:1.

In a specific example, the first direction is a vertical direction on the basis of the assembled battery module, and the second direction is a horizontal direction on the basis of the assembled battery module.

In one example first and second uneven patterns are each independently ellipse-shaped, bead-shaped, or tetragon to decagon shaped, or the first and second uneven patterns have rectangular central regions and have semi-circular shapes at both ends.

In one specific example, the first uneven patterns have a bead shape which is long in a first direction, and form the maximum protrusion height along the center line of the bead shape, in which the protrusion height gradually or continually increases toward the center line of the bead shape from the edge of the bead shape.

In one specific example, the second uneven patterns have a bead shape which is long in the first direction, and recess depths of the entire region of the bead shape are at the equivalent level.

In another specific example, the second uneven patterns have a bead shape which is long in a first direction, and form the maximum recess depth along the center line of the bead shape, in which the recess depth gradually or continually increases toward the center line of the bead shape from the edge of the bead shape.

In one example, the first and second uneven patterns are alternatively arranged.

In a specific example, the first and second uneven patterns may be alternately arranged and be spaced apart from each other.

In one example, the battery module cover material according to the present invention has a structure in which one or both ends of a plate-shaped structure are bent in one direction, and the bent structure has a through hole for fastening.

Further, the present invention provides a battery module including the battery module cover material described above as a side surface cover material.

Further, the present invention provides a method for manufacturing a battery module cover material described above. In one example, a method for manufacturing a battery module cover material according to the present invention includes: a step of forming first uneven patterns of a shape protruding in a thickness direction on a plate-shaped cover covering a battery module; and a step of forming second uneven patterns of a shape recessed in a thickness direction on a plate-shaped cover having the first uneven patterns formed thereon, wherein the second uneven patterns are arranged between the first uneven patterns, and wherein an average recess depth of the second uneven patterns is in a range of 10 to 80% of a thickness of the cover material.

In one specific example, the average thickness of the plate-shaped cover material is in the range of 0.1 to 0.6 mm.

Advantageous Effects

Even though the battery module cover material according to the present invention is manufactured as a thin film, the mechanical strength and flatness are excellent by forming uneven patterns protruding in different directions.

BRIEF DESCRIPTION OF THE DRAWINGS

FIG. 1 is a perspective view of a conventional battery module.

FIGS. 2 to 4 are perspective views for a battery module cover material according to one embodiment of the present invention, respectively.

FIG. 5 is a perspective view of a battery module according to one embodiment of the present invention.

FIG. 6 shows a schematic diagram showing a flatness evaluation process for prepared metal thin film specimens, and its enlarged partial view.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention provides a battery module cover material. In one example, a battery module cover material according to the present invention is plate-shaped cover material covering one surface of a battery module and includes first uneven patterns protruding in a thickness direction; and second uneven patterns recessed in a thickness direction, and the second uneven patterns are arranged between the first uneven patterns. Further, the average recess depth of the second uneven pattern is in a range of 10 to 80% of the thickness of the plate-shaped cover material. In the present invention, in order to lighten and volume-minimize the battery module, a metal thin film is used, and in order to bear the load of the battery module and increase the rigidity of the battery module, uneven patterns may be formed in a vertical direction. However, in the cover material of a metal thin film form, twisting or bending occurs during the molding process, and particularly, the flatness of the cover material significantly decreases in the process of forming first uneven patterns. The battery module cover material according to the present invention forms a first uneven pattern protruding in a thickness direction and forms a second uneven pattern recessed in the thickness direction at the same time.

Further, in the present invention, the uneven pattern recessed in the thickness direction is formed in a very thin level. In the present invention, the average recess depth of the second uneven pattern is in a range of 10 to 80% of the thickness of the plate-shaped cover material. Specifically, the average recess depth of the second uneven pattern is in a range of 10 to 80%, 10 to 60%, 15 to 50% or 20 to 30% of the thickness of the plate-shaped cover material. The second uneven pattern recessed in the thickness direction becomes a cause of decreasing the loading capacity of the case including the cover material. Further, if the recess depth of the second uneven pattern formed on the metal thin film becomes large, a breakage may occur in the process of forming the pattern. On the other hand, if the recess depth of the second uneven pattern is very small, a desired level of flatness and mechanical strength cannot be obtained. Therefore, in the present invention, the flatness of the battery module cover material can be secured in a very high level by controlling the recess depth of the second uneven patterns to the range, and the mechanical strength of the cover material can also be improved to a certain level.

In one embodiment, the average thickness of the plate-shaped cover material is in the range of 0.1 to 0.6 mm. Specifically, the average thickness of the plate-shaped cover material is in the range of 0.2 to 0.55 mm, 0.15 to 0.5 mm, 0.3 to 0.55 mm, or 0.35 to 0.45 mm. The plate-shaped cover material may be a metal thin film formed of aluminum (Al) or its alloy. When the thickness of the plate-shaped cover material is greater than the value in the above range, the weight of the battery module increases, and when the thickness of the plate-shaped cover material is smaller than the value in the above range, the mechanical strength required as the cover material is not secured. In the present invention, even if a thin plate-shaped cover material is applied, the cover material is not easily twisted or bent during the molding process, and a high flatness can be maintained.

In one embodiment, a ratio (D1:D2) of an average protrusion height (D1) of the first uneven patterns to an average recess depth (D2) of the second uneven patterns is in a range of 3:1 to 50:1. In the present invention, the mechanical rigidity is reinforced by forming the first uneven patterns protruding in the thickness direction in the battery module cover material. Further, in the present invention, the second uneven patterns recessed in the thickness direction are formed in a very thin level. This does not decrease the load capacity of the battery module case including the cover material while increasing the flatness of the battery module cover material. Specifically, the ratio (D1:D2) is in the range of 3:1 to 30:1, the range of 3:1 to 10:1, the range of 5:1 to 20:1, the range of 5:1 to 10:1, the range of 10:1 to 30:1, or the range of 5:1 to 15:1.

In a specific embodiment, the average protrusion height (D1) of the first uneven patterns is in the range of 1 mm to 10 cm. For example, the average thickness of the plate-shaped cover material is in the range of 0.1 to 0.6 mm, the average recess depth (D2) of the second uneven patterns is in the range of 0.01 to 0.45 mm, and the average protrusion height (D1) of the first uneven patterns is in the range of 0.03 to 24 mm. For another example, the average thickness of the plate-shaped cover material is in the range of 0.3 to 0.5 mm, the average recess depth (D2) of the second uneven patterns is in the range of 0.045 to 0.2 mm, and the average protrusion height (D1) of the first uneven patterns is in the range of 0.225 to 4 mm.

In one embodiment, the first uneven patterns have a closed figure shape which is long in the first direction, and the ratio (L1:L2) of the width (L1) in the first direction to the width (L2) in the second direction perpendicular to the first direction on the same plane is in the range of 3:1 to 10:1. Specifically, the ratio (L1:L2) is in the range of 3:1 to 8:1, the range of 3:1 to 5:1, the range of 5:1 to 10:1, or the range of 4:1 to 6:1. The ratio of the length and width of the first uneven patterns is for effectively reinforcing the mechanical strength in the first direction of the cover material.

In another embodiment, the second uneven patterns have a closed figure shape which is long in the first direction, and the ratio (L1':L2') of the width (L1') in the first direction to the width (L2') in the second direction perpendicular to the first direction on the same plane is in the range of 5:1 to 20:1. Specifically, the ratio (L1':L2') is in the range of 5:1 to 15:1, the range of 3:1 to 10:1, the range of 8:1 to 20:1, or the range of 8:1 to 15:1. The second uneven patterns can effectively supplement the mechanical strength while increasing the flatness of the cover material by controlling the ratio of the length and the width to be within the range. In the present invention, the first direction mentioned with reference to the first uneven patterns and the first direction mentioned with reference to the second uneven patterns may be the same direction and may be a vertical direction at the time of manufacturing a battery module. In some cases, the first directions may be different directions, for example, directions perpendicular to each other. In a specific example, the first direction is a vertical direction on the basis of the assembled battery module, and the second direction is a horizontal direction on the basis of the assembled battery module.

In one embodiment, first and second uneven patterns are each independently ellipse-shaped, bead-shaped, or tetragon to decagon shaped, or the first and second uneven patterns have rectangular central regions and have semi-circular shapes at both ends. For example, in each of the first and second uneven patterns, the central region may be rectangular, and both ends may be semi-circular.

In one specific embodiment, the first uneven patterns have a bead shape which is long in a first direction, and form the maximum protrusion height along the center line of the bead shape, in which the protrusion height gradually or continually increases toward the center line of the bead shape from the edge of the bead shape.

In another specific embodiment, the second uneven patterns have a bead shape which is long in the first direction, and recess depths of the entire region of the bead shape are at the equivalent level. The point that, in the second uneven patterns of the present invention, the recess depths of the entire region are at the equivalent level means that the depths of the entire region of the pattern are substantially the same, and the depths are partially different due to the mechanical or technical limitation. For example, there may be differences in depths to a point reaching a certain depth in the edge region.

In another specific embodiment, the second uneven patterns have a bead shape which is long in a first direction, and form the maximum recess depth along the center line of the bead shape, in which the recess depth gradually or continually increases toward the center line of the bead shape from the edge of the bead shape.

In one embodiment, the first and second uneven patterns are alternatively arranged. For example, the first and second uneven patterns may be alternately arranged and may be long in the same direction. In another example, 2 to 4 second uneven patterns may be formed between the first uneven patterns, which may be long in the same direction. In another example, the first and second uneven patterns may be long in directions perpendicular to each other, and in this case, 2 to 4 second uneven patterns may be formed between the first uneven patterns.

More specifically, the first and second uneven patterns may be alternately arranged and be spaced apart from each other. Namely, allowing the first and second uneven patterns to be spaced apart from each other is more effective in improving the mechanical strength and flatness of the cover material. In the present invention, the first and second uneven patterns may be formed to be duplicated. For example, the present invention may include a structure in which second uneven patterns of a small area are formed within first uneven patterns of a large area.

In one embodiment, the battery module cover material according to the present invention has a structure in which one or both ends of a plate-shaped structure are bent in one direction, and the bent structure has a through hole for fastening. By forming the bent structure on the side surface of the cover material, the fastening position for the battery module or the battery module case can be designated, and the fastening can be fixed through the bolt fastening by the through hole, etc.

Further, the present invention provides a battery module case including the battery module cover material described above as a side surface cover material. In one embodiment, the battery module case has a structure on which a plurality of battery cells are mounted, and the external structure or shape of the battery module case may vary depending on the requirements of the applicable field. For example, the battery module case has a structure including a lower tray and an upper cover material and including a side surface cover material for fastening the lower tray with the upper cover material.

Further, the present invention provides a battery module case including the battery module cover material described above as a side surface cover material. A battery module according to the present invention includes: a battery module case described above; and a plurality of cell cells accommodated in the battery module case. One or two or more battery modules may be assembled to form a battery pack. The battery pack is applicable to a power source or a large power storage device of a vehicle. The vehicle is, for example, an electric vehicle, a hybrid vehicle, a plugin vehicle, or the like.

Further, the present invention provides a method for manufacturing a battery module cover material described above. In one embodiment, a method of manufacturing a battery module cover material according to the present invention includes: a step of forming first uneven patterns having a shape protruding in a thickness direction on a plate-shaped cover covering one surface of a battery module; and a step of forming second uneven patterns of a shape recessed in a thickness direction on a plate-shaped cover having the first uneven patterns formed thereon. Specifically, the second uneven patterns are arranged between the first uneven patterns, and the average recess depth of the second uneven patterns is in the range of 10 to 80% of the thickness of the plate-shaped cover material.

In one embodiment, in the method of manufacturing a battery module cover material, a step of forming first uneven patterns having a shape protruding in a thickness direction on a plate-shaped cover covering one surface of a battery module; and a step of forming second uneven patterns of a shape recessed in a thickness direction on a plate-shaped cover having the first uneven patterns formed thereon can be simultaneously or sequentially performed.

For example, the step of forming the first uneven patterns can be performed by pressing the plate-shaped cover. Further, the step of forming the second uneven patterns can be performed by punching the plate-shaped cover. Further, in the present invention, the steps of forming the first and second uneven patterns can be performed by pressing the plate-shaped cover, respectively, or the steps of forming the first and second uneven patterns can be simultaneously performed by pressing the plate-shaped cover. Herein, the step of forming the first uneven patterns can be preferably performed by pressing the plate-shaped cover, and the step of forming the second uneven patterns can be preferably performed by punching the plate-shaped cover from the perspective of enhancing the flatness for the plate-shaped cover.

In one embodiment, the average thickness of the plate-shaped cover material is in the range of 0.1 to 0.6 mm. Specifically, the average thickness of the plate-shaped cover material is in the range of 0.2 to 0.55 mm, 0.15 to 0.5 mm, 0.3 to 0.55 mm, or 0.35 to 0.45 mm. In the present invention, even if a thin plate-shaped cover material is applied, the cover material is not easily twisted or bent during the molding process, and a high flatness can be maintained.

DETAILED DESCRIPTION OF THE PREFERRED EMBODIMENTS

Hereinafter, the present invention will be described in more detail through drawings and the like. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

First Embodiment

FIGS. 2 to 4 are perspective views for a battery module cover material according to one embodiment of the present invention, respectively.

First, referring to FIG. 2, the battery module cover material 100 according to one embodiment of the present invention has a plate-shaped form covering one surface of the battery module. The battery module cover material 100 is a plate-shaped structure formed of aluminum or its alloy, and the aluminum plate of the battery module cover material 100 is about 0.4 T (mm). First uneven patterns 110 protruding in a thickness direction; and second uneven patterns 120 recessed in a thickness direction are formed on the surface of the plate-shaped structure. The second uneven patterns 120 are arranged between the first uneven patterns 110.

The first uneven patterns 110 have a bead shape which is long in a vertical direction, and form the maximum protrusion height along the center line of the bead shape, in which the protrusion height gradually increases toward the center line of the bead shape from the edge of the bead shape. In the plane shape of the first uneven patterns 110, the ratio (L1:L2) of the width (L1) in the vertical direction to the width (L2) in the horizontal direction is about 5:1. Likewise, the plane shape is long in the vertical direction.

Further, the second uneven patterns 120 have a bead shape which long in the vertical direction, and recess depths of the entire region of the bead shape are at the equivalent level. In the plane shape of the second uneven patterns 120, the ratio (L1':L2') of the width (L1') in the vertical direction to the width (L2') in the horizontal direction is about 10:1. Likewise, the plane shape is long in the vertical direction.

The first and second uneven patterns 110 and 120 are alternately arranged and are spaced apart from each other. The maximum protrusion height (D1) of the first uneven patterns 110 is about 2 cm, and the maximum recess depth (D2) of the second uneven patterns 120 is about 0.15 mm. In the present invention, the first uneven patterns 110 have a pattern structure protruding in a vertical direction to bear the load in the vertical direction, and the second uneven patterns 120 are formed to enhance the flatness of the cover material 100 and have a structure formed to have a very small thickness.

Further, both upper and lower ends of a pate shape of the battery module case 100 have a bent portion 130 which is bent toward the inside (on the basis of the battery module), and through holes 131 for bolt fastening are formed on the bent portion 130.

Second Embodiment

First, referring to FIG. 3, the battery module cover material 200 according to another embodiment of the present invention has a plate-shaped form covering one surface of the battery module. The battery module cover material 200 is a plate-shaped structure formed of aluminum or its alloy, and the aluminum plate of the battery module cover material 100 is about 0.35 T. First uneven patterns 210 protruding in a thickness direction; and second uneven patterns 220 recessed in a thickness direction are formed on the surface of the plate-shaped structure. 4 second uneven patterns 120 are arranged between the first uneven patterns 110, respectively.

The first uneven patterns 210 have a bead shape which is long in a vertical direction, and the second uneven patterns 220 have a bead shape having a width smaller than that of the first uneven patterns 210. Each shape of the first and second uneven patterns 210 and 220 is similar to what was described with reference to FIG. 2.

The maximum protrusion height (D1) of the first uneven patterns 210 is about 3 cm, and the maximum recess depth (D2) of the second uneven patterns 120 is about 0.2 mm. In the present invention, the first uneven patterns 210 have a pattern structure protruding in a vertical direction to bear the load in the vertical direction, and the second uneven patterns 220 have a structure for enhancing the flatness together with supplementing the mechanical strength of the cover material 100.

Further, both upper and lower ends of a pate shape of the battery module case 200 have a bent portion 230 which is bent toward the inside (on the basis of the battery module), and through holes 231 for bolt fastening are formed on the bent portion 230.

Third Embodiment

First, referring to FIG. 4, the battery module cover material 300 according to another embodiment of the present invention has a plate-shaped form covering one surface of the battery module. The battery module cover material 300 is a plate-shaped structure formed of aluminum or its alloy, and the aluminum plate of the battery module cover material 300 is about 0.41 T. First uneven patterns 310 protruding in a thickness direction; and second uneven patterns 320 recessed in a thickness direction are formed on the surface of the plate-shaped structure. 3 second uneven patterns 320 are arranged between the first uneven patterns 310, respectively.

The first uneven patterns 310 have a bead shape which is long in a vertical direction, and the second uneven patterns 320 have a bead shape which is long in a horizontal direction. Each shape of the first and second uneven patterns 310 and 320 is similar to what was described with reference to FIG. 2.

The maximum protrusion height (D1) of the first uneven patterns 310 is about 3.5 cm, and the maximum recess depth (D2) of the second uneven patterns 320 is about 0.1 mm. In the present invention, the first uneven patterns 310 have a pattern structure protruding in a vertical direction to bear the load in the vertical direction, and the second uneven patterns 320 have a structure for enhancing the flatness together with supplementing the mechanical strength in the horizontal direction of the cover material 300.

Further, both upper and lower ends of a pate shape of the battery module case 300 have a bent portion 330 which is bent toward the inside (on the basis of the battery module), and through holes 331 for bolt fastening are formed on the bent portion 330.

Fourth Embodiment

FIG. 5 is a perspective view of a battery module according to one embodiment of the present invention. Referring to FIG. 5, a battery module 400 according to the present invention has a structure in which a plurality of battery cells are accommodated in a battery module case. The battery module cover material 100 applied to the side surface of the battery module 400 is formed of an aluminum thin film of about 0.4 T of the battery module 400, and first and second uneven patterns 110 and 120 are applied to the surface thereof.

The first uneven patterns 110 have a bead shape protruding in a thickness direction, and the second uneven patterns 120 have a shape recessed in a thickness direction. The specific description on the battery module cover material 100 is redundant with the above description about FIG. 2.

Hereinafter, the present invention will be described in more detail through examples.

Example 1

First uneven patterns having a shape protruding in a thickness direction are formed by pressing an aluminum thin film having the average thickness of 0.4 mm and the width and length of 10 cm×5 cm. Therefore, second uneven patterns having a shape recessed in the thickness direction were formed by punching the aluminum thin film. 5 first uneven patterns were formed in a bead shape at regular intervals, and the second uneven patterns were formed between the first uneven patterns. The average protrusion height (D1) of the first uneven patterns is 1.5 mm, and the average recess depth (D2) of the second uneven patterns is 0.1 mm. The specific shape of the uneven patterns formed on the specimen is shown in FIG. 2.

Example 2

First uneven patterns having a shape protruding in a thickness direction are formed by pressing an aluminum thin film having the average thickness of 0.4 mm and the width and length of 10 cm×5 cm. Therefore, second uneven patterns having a shape recessed in the thickness direction were formed by punching the aluminum thin film. 5 first uneven patterns were formed in a bead shape at regular intervals, and the second uneven patterns were formed between the first uneven patterns. The average protrusion height (D1) of the first uneven patterns is 2 mm, and the average recess depth (D2) of the second uneven patterns is 0.1 mm. The specific shape of the uneven patterns formed on the specimen is shown in FIG. 2.

Example 3

First uneven patterns having a shape protruding in a thickness direction are formed by pressing an aluminum thin film having the average thickness of 0.5 mm and the width and length of 10 cm×5 cm. Therefore, second uneven patterns having a shape recessed in the thickness direction were formed by punching the aluminum thin film. 5 first uneven patterns were formed in a bead shape at regular intervals, and the second uneven patterns were formed between the first uneven patterns. The average protrusion height (D1) of the first uneven patterns is 1.5 mm, and the average recess depth (D2) of the second uneven patterns is 0.1 mm. The specific shape of the uneven patterns formed on the specimen is shown in FIG. 2.

Example 4

First uneven patterns having a shape protruding in a thickness direction are formed by pressing an aluminum thin film having the average thickness of 0.5 mm and the width and length of 10 cm×5 cm. Therefore, second uneven patterns having a shape recessed in the thickness direction were formed by punching the aluminum thin film. 5 first uneven patterns were formed in a bead shape at regular intervals, and the second uneven patterns were formed between the first uneven patterns. The average protrusion height (D1) of the first uneven patterns is 2 mm, and the average recess depth (D2) of the second uneven patterns is 0.1 mm. The specific shape of the uneven patterns formed on the specimen is shown in FIG. 2.

Comparative Example 1

The specimen was processed in the same manner as in Example 1 except that second uneven patterns were not formed.

Comparative Example 2

The specimen was formed in the same manner as in Example 1 except that the average recess depth (D2) of the second uneven patterns was 0.4 mm.

Comparative Example 3

The specimen was formed in the same manner as in Example 1 except that the average recess depth (D2) of the second uneven patterns was 0.3 mm.

Experimental Example 1

Evaluation of Flatness for Specimen

The flatness was compared for respective specimens manufactured in Examples and Comparative examples. The evaluation result is shown in Table 1 below.

As illustrated in FIG. 6, in order to evaluate the flatness, each of the manufactured specimens was placed on the floor and the maximum value (D) of separation distances with the floor was measured. Referring to FIG. 6, the specimen 500 was made of an aluminum thin film having the width and the length of 10 cm×5 cm. Further, first uneven patterns 510 protruding in the thickness direction are formed on the specimen 500. Further, as illustrated in the partial enlarged view of dotted lines, the specimen 500 manufactured in Examples 1-4 has a structure in which second uneven patterns 520 having a shape recessed in the thickness direction are formed. Further, each specimen 500 was placed on the floor, and the maximum value (D) of separation distances with the floor was measured.

TABLE 1

| Example No. | Specimen thickness (mm) | Average protrusion height of first uneven patterns (D1, mm) | Average recess depth of second uneven patterns (D2, mm) | Maximum separation distance (D, mm) |
|---|---|---|---|---|
| Example 1 | 0.4 | 1.5 | 0.1 | 2.5 |
| Example 2 | 0.4 | 2 | 0.1 | 3 |
| Example 3 | 0.5 | 1.5 | 0.1 | 1.8 |
| Comparative Example 1 | 0.4 | 1.5 | — | 9 |
| Comparative Example 2 | 0.4 | 1.5 | 0.4 | 1.5 |
| Comparative Example 3 | 0.4 | 1.5 | 0.03 | 7.5 |

Referring to Table 1, in Example 1, the maximum separation distance (D1) is 2.5 mm, which shows that the flatness of the specimen significantly increased, compared to Comparative example 1 in which the maximum separation distance (D) is 9 mm. In Example 2, when the protrusion height (D1) of the first uneven patterns increased, the flatness also increased. In Example 3, as thickness of the specimen increased, the flatness (D) increased under same processing conditions, compared to Example 1. However, in Example 3, as the thickness of the specimen increased, the weight also increased.

In Comparative example 2, the average recess depth (D2) of the second uneven patterns was controlled to be 0.4 mm which corresponds to 100% of the specimen thickness. In Comparative example 2, the flatness of the specimen was best. However, in the specimen according to comparative example 2, a breakage of the specimen was observed on the region where the second uneven patterns were formed.

Further, in Comparative example 3, the average recess depth (D2) of the second uneven patterns was controlled to be 0.03 mm which corresponds to 7.5% of the specimen thickness. In Comparative example 3, even though the second uneven patterns were formed, the flatness of the specimen was effectively not improved.

The above description is merely illustrative of the technical idea of the present invention, and those skilled in the art to which the present invention pertains may make various modifications and variations without departing from the essential characteristics of the present invention. Therefore, the drawings and embodiments disclosed in the present invention are not intended to limit the technical idea of the present invention but to describe the present invention, and the scope of the technical idea of the present invention is not limited by these drawings and embodiments. The scope of protection of the present invention should be interpreted by the following claims, and all technical ideas within the scope equivalent thereto should be construed as being included in the scope of the present invention.

DESCRIPTION OF REFERENCE NUMERALS 10, 100, 200, 300: battery module cover material
11: uneven pattern
20, 400: battery module
110, 210, 310, 510: first uneven patterns
120, 220, 320, 520: second uneven patterns
130, 230, 330: bent portion
131, 231, 331: through hole
500: specimen
D: maximum value of separation distances

The invention claimed is:

1. A plate-shaped cover material for a battery module, the cover material comprising:
   first uneven patterns having a shape protruding from a surface in a thickness direction, the first uneven patterns being spaced apart from one another in a horizontal direction perpendicular to the thickness direction; and
   second uneven patterns having a shape recessed from the surface in the thickness direction,
   wherein the second uneven patterns are arranged between the first uneven patterns, the second uneven patterns each having a closed figure shape that is long in a vertical direction perpendicular to the horizontal direction and the thickness direction, the second uneven patterns having closed top and bottom ends spaced apart from respective top and bottom edges of the surface with non-recessed portions of the surface extending therebetween,
   wherein an average recess depth of the second uneven patterns is in a range of 10 to 80% of a thickness of the cover material, and
   wherein a ratio of an average protrusion height of the first uneven patterns to an average recess depth of the second uneven patterns is in a range of 3:1 to 50:1.

2. The cover material of claim 1, wherein the average thickness of the cover material is in a range of 0.1 to 0.6 mm.

3. The cover material of claim 1, wherein the first uneven patterns each have a closed figure shape which is long in the vertical direction,
   wherein the first uneven patterns each have a ratio of a width in the vertical direction to a width in the horizontal direction is in a range of 3:1 to 10:1.

4. The cover material of claim 1,
   wherein the second uneven patterns each have a ratio of a width in the vertical direction to a width in the horizontal direction perpendicular to the first direction is in a range of 5:1 to 20:1.

5. The cover material of claim 1, wherein the first and second uneven patterns are each independently ellipse-shaped, bead-shaped, or tetragon to decagon shaped, or the first and second uneven patterns each have rectangular central regions and have semi-circular shapes at opposite ends thereof.

6. The cover material of claim 1, wherein the first uneven patterns each have a bead shape which is long in the vertical direction,
- wherein a maximum protrusion height is formed along a center line of the respective bead shape, and
- wherein a protrusion height sequentially or continuously increases from an edge of the respective bead shape toward the center line of the respective bead shape.

7. The cover material of claim 1, wherein the second uneven patterns each have a bead shape which is long in the vertical direction,
- wherein recess depths of an entire region of each of the bead shapes are at an equivalent level.

8. The cover material of claim 1, wherein the second uneven patterns each have a bead shape which is long in the vertical direction,
- wherein a maximum recess depth is formed along a center line of the respective bead shape,
- wherein a recess depth sequentially or continuously increases from an edge of the respective bead shape toward the center line of the respective bead shape.

9. The cover material of claim 1, wherein the first and second uneven patterns are alternately arranged.

10. The cover material of claim 1, wherein the first and second uneven patterns are alternately arranged and are spaced apart from each other.

11. The cover material of claim 1, wherein one end or both ends of a plate shape have a structure bent in one direction, and wherein the bent structure has through holes for fastening to the battery module.

12. A battery module including the cover material of claim 1 as a side surface cover material.

13. A method for manufacturing a battery module cover material, the method comprising:
- forming first uneven patterns of a shape protruding from a surface of a plate-shaped cover in a thickness direction, the first uneven patterns being spaced apart from one another in a horizontal direction perpendicular to the thickness direction; and
- forming second uneven patterns of a shape recessed in the thickness direction from the surface of the plate-shaped cover having the first uneven patterns formed thereon, the second uneven patterns each having a closed figure shape that is long in a vertical direction perpendicular to the horizontal direction and the thickness direction, the second uneven patterns having closed top and bottom ends spaced apart from respective top and bottom edges of the surface with non-recessed portions of the surface extending therebetween,
- wherein the second uneven patterns are located between the first uneven patterns,
- wherein an average recess depth of the second uneven patterns is in a range of 10 to 80% of a thickness of the cover material, and
- wherein a ratio of an average protrusion height of the first uneven patterns to an average recess depth of the second uneven patterns is in a range of 3:1 to 50:1.

14. The cover material of claim 1, wherein the average thickness of the cover material is in a range of 0.1 to 0.6 mm.

* * * * *